United States Patent [19]

Sauer

[11] Patent Number: 5,134,489
[45] Date of Patent: Jul. 28, 1992

[54] X-Y ADDRESSABLE SOLID STATE IMAGER FOR LOW NOISE OPERATION

[75] Inventor: Donald J. Sauer, Allentown, N.J.

[73] Assignee: David Sarnoff Research Center, Inc., Princeton, N.J.

[21] Appl. No.: 634,893

[22] Filed: Dec. 28, 1990

[51] Int. Cl.⁵ .................................... H04N 5/335
[52] U.S. Cl. ................... 358/213.26; 358/213.27; 358/213.29; 358/213.31; 250/211 J
[58] Field of Search ............. 358/212, 213.11, 213.13, 358/213.26, 213.23, 213.27, 213.29, 213.31, 213.15; 260/211 J, 338, 330, 332, 333; 357/32, 24 LR

[56] References Cited

U.S. PATENT DOCUMENTS

| | | | |
|---|---|---|---|
| 3,842,274 | 10/1974 | Greene et al. | 250/330 |
| 4,233,632 | 11/1980 | Akiyama | 358/213.31 |
| 4,242,706 | 12/1980 | McCormack et al. | 358/213 |
| 4,274,113 | 6/1981 | Ohba et al. | 358/213.31 |
| 4,301,477 | 11/1981 | Takemoto et al. | 358/213.31 |
| 4,363,963 | 12/1982 | Ando | 250/211 |
| 4,368,385 | 1/1983 | Kanbe et al. | 250/211 J |
| 4,456,929 | 6/1984 | Aoki et al. | 358/213.31 |
| 4,484,224 | 11/1984 | Sato et al. | 358/213.31 |
| 4,498,106 | 2/1985 | Sato et al. | 358/213.31 |
| 4,532,549 | 7/1985 | Ozaki et al. | 358/213.31 |
| 4,633,086 | 12/1986 | Parrish | 250/338 |
| 4,638,362 | 1/1987 | Oshima | 358/213 |
| 4,651,001 | 3/1987 | Harada et al. | 250/330 |
| 4,659,928 | 4/1987 | Tew | 250/332 |
| 4,660,066 | 4/1987 | Reid | 357/30 |
| 4,670,653 | 6/1987 | McConkle et al. | 250/330 |
| 4,672,412 | 6/1987 | Wei et al. | 357/30 |
| 4,684,812 | 8/1987 | Tew et al. | 250/578 |
| 4,720,738 | 1/1988 | Simmons | 357/30 |
| 4,733,077 | 3/1988 | Gaalema et al. | 250/338 |
| 4,808,822 | 2/1989 | Manning et al. | 250/332 |
| 4,835,617 | 5/1989 | Todaka | 358/213 |
| 5,043,821 | 8/1991 | Suga | 358/213 |

OTHER PUBLICATIONS

S. Nishizawa et al., "A New, Transversal Signal Line (TSL) Type Solid State Imager", Oct. 1986, pp. 42-47, SPSE 26th Fall Symposium.

D. J. Sauer et al., "A 640×480-Element PtSi IR Sensor with Low-Noise MOS X-Y Addressable Multiplexer", Apr. 18, 1990, Paper No. 1308-07, SPIE 1990 Technical Symposium on Optical Engineering and Photonics in Aerospace Sensing, Orlando, FL.

Primary Examiner—John K. Peng
Assistant Examiner—Glenton B. Burgess
Attorney, Agent, or Firm—William J. Burke

[57] ABSTRACT

An X-Y addressable imager utilizes a gate connection of a source-follower-connected MOSFET to isolate inherent capacitance of each horizontal signal line of the imager from a vertical signal line that couples the MOSFETs to a common output circuit, including a load resistor for the source followers. In one embodiment the horizontal signal lines are assigned to different groups, and each group is coupled through a different one of plural vertical signal lines to the common output circuit. At least one multiplexer couples one vertical signal line at a time to the common output circuit. Also shown is imager array scanning logic for effecting variable integration of array pixels.

22 Claims, 4 Drawing Sheets

X-Y ADDRESSABLE SOLID STATE IMAGER FOR LOW NOISE OPERATION

RELATED APPLICATIONS FOR PATENT

A U.S. Pat. application U.S. Pat. application Ser. No. 635,452 entitled "X-Y Addressable Imager With Variable Integration" by the same inventor, filed concurrently herewith, and assigned to the same assignee as the present application, is related to the present patent application and is directed to a method for operating an imager under different degrees of scene illumination.

FIELD OF THE INVENTION

This invention relates to an optical imager including an X-Y addressable array of light-responsive, semiconductor, picture elements.

BACKGROUND OF THE INVENTION

In an X-Y addressable imager, the picture elements, called pixels, are arrayed in rows and columns. Charge integrated by photodiodes in respective pixels is read out by scanning all pixels along a row in sequence and row by row. For convenience of description of electronic circuits associated with addressing pixels and for sensing pixel charge, the row circuits have come to be called "horizontal" circuits and column circuits have come to be called "vertical" circuits; and in some cases signals in such circuits are similarly distinguished. This even though there is no implication of physical orientation other than the row and column association. Accordingly, the distinguishing horizontal and vertical qualifiers are employed herein.

Optical imagers with two-transistor pixels and vertical and horizontal scan registers for addressing respective transistors of the pixels are known in the art. One example is to be found in an S. Nishizawa et al. paper "A New, Transversal Signal Line (TSL) Type Solid State Imager," SPSE 26th Fall Symposium, Oct. 1986, pages 42-47; and it relates to an MOS-type color imager in which each major pixel has four photodiode pixels (one each for the colors white, green, yellow, and blue). Separate horizontal signal lines (HSL) collect pixel output signals for pixels of each color along a row of pixels, and a separate vertical signal line (VSL) for each color is coupled through source-drain paths of switching transistors to collect signals from all HSLs of its color. A reset pulse is applied to each HSL at the onset of its scanning period.

In U.S. Pat. No. 4,242,706 to K. McCormack et al., a solid state imaging device includes a field effect transistor (FET), multiplexing switch, source-drain, current path, connected in series with a sensing line, i.e. an HSL. The HSL couples a vertical-select part of all pixel, dual-gate, MOSFET switches along the sense line to one vertical signal line for the entire array. That VSL is continuously coupled to the input of an output amplifier.

A U.S. Pat. No. 4,274,113 to S. Ohba et al. shows a signal processing circuit for connection to a series combination of horizontal and video sensing circuits of a solid state imaging device. A source follower gate connection isolates an integrated output of the combination circuit from parasitic capacitance effects in the source follower output.

As steps are taken to improve imager, detector array, pixel, fill factor (the percent of pixel area covered by active photodiode material) and to improve low temperature operation, signal line inherent capacitance becomes more of a problem because it causes noise evidenced by reproduction of an indistinct, i.e., snowy, image. In an infrared imager, such an image also lacks fine temperature resolution. The combination of horizontal and vertical signal lines in series in large arrays, e.g., hundreds of pixels along each of the X and Y coordinate directions, is a large contributor to the noted inherent capacitance.

SUMMARY OF THE INVENTION

Noise problems in imaging arrangements are mitigated by coupling readout signals from each horizontal signal line (HSL) of an imaging array through an isolating switch and a vertical signal line (VSL) to an output. The switch presents a sufficiently high impedance to block significant current flow between the HSL and the VSL when signals are being read from the HSL.

According to one aspect of the invention, plural VSLs are provided, each serving a different group of the HSLs. Signals from each VSL which is connected to a fully selected pixel are multiplexed to the array output.

In accordance with a further aspect of the invention, the isolating switch includes a source-follower-connected field effect transistor (FET) which is coupled through its VSL to a common load resistor (member) by a multiplexing switch.

In accordance with yet another aspect of the invention, for arrays having VSLs of significant resistance, dual multiplexers are employed, one at each end of the plural VSLs to connect the load resistor (member) to one end of a selected VSL and the output amplifier to the other end of the same VSL at the same time.

BRIEF DESCRIPTION OF THE DRAWING

A more complete understanding of the invention and its various features, objects, and advantages may be obtained by a consideration of the following Detailed Description and the appended claims in conjunction with the attached drawings in which:

DETAILED DESCRIPTION

Figure 1:
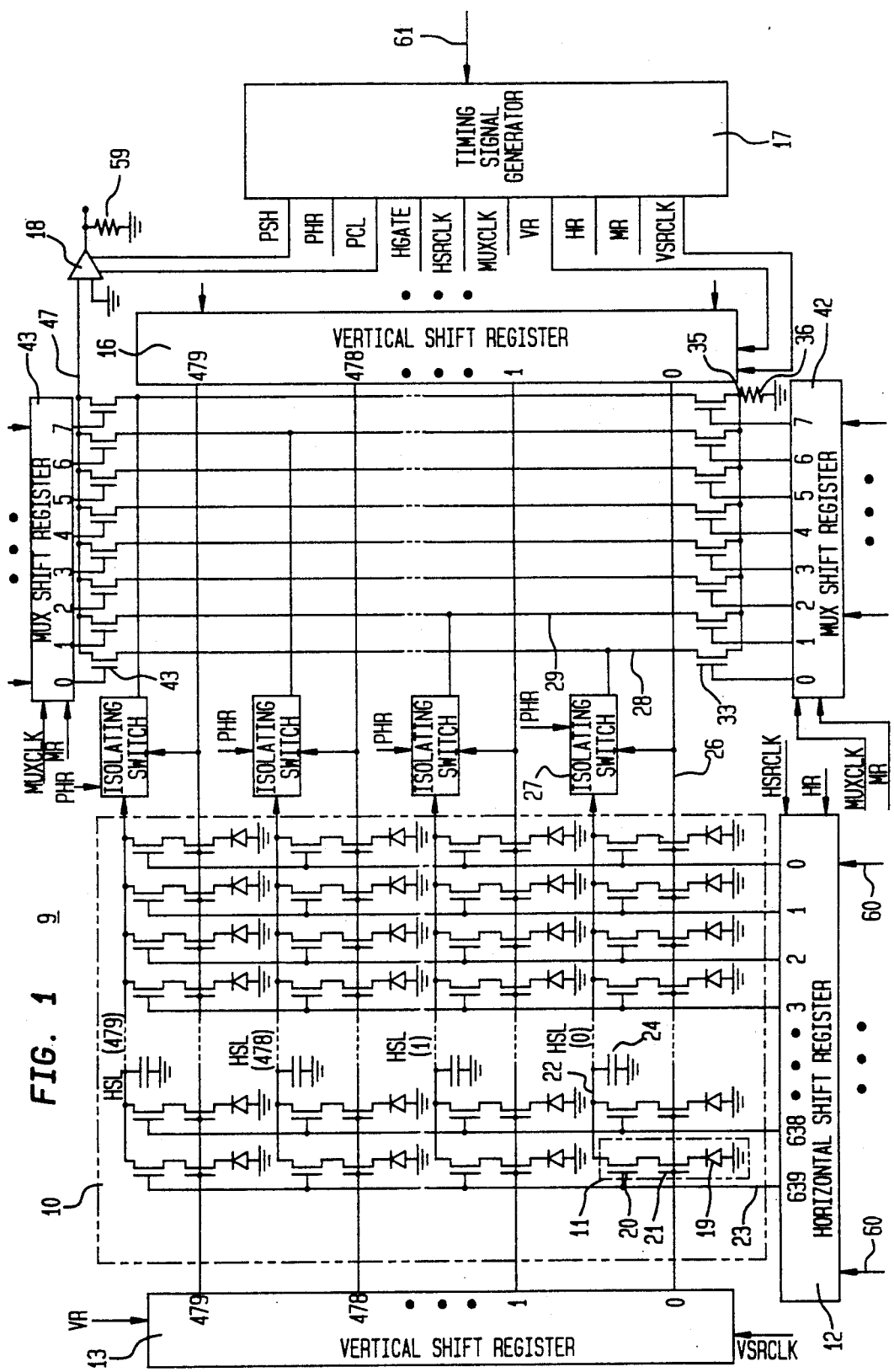
FIG. 1 is a schematic diagram of a solid state imaging system utilizing the invention.

In FIG. 1 is shown an X-Y addressable, solid state, imaging system 9 utilizing the present invention. The basic configuration and operation of such arrangements are well known in the art, but will be described here to a limited extent to facilitate an understanding of the invention utilized in the system illustrated. A wide field of view, infrared, imaging system will be illustratively described; but the principles of the invention are applicable to other types of imagers as well.

An infrared detector array 10 is a multilayer integrated circuit device including picture elements (pixels), such as the pixel 11 schematically represented within an inner broken-line box, designated "11," arranged in M rows and N columns of pixels. The array illustratively comprises 480 rows of pixels, each including 640 pixels. All of the pixels are of the same design; so, to preserve drawing simplicity, the same reference character is hereinafter used for any one of them. The same schematic convention, of utilizing a single reference character to refer to any one of plural like circuit elements, is also employed as to other elements in the drawings.

A horizontal shift register (HSR) 12 and two vertical shift registers (VSRs) 13 and 16, are driven by recurrent clocking signals HSRCLK and VSRCLK, respectively, from a timing signal generator 17. The shift registers address the pixels row by row and individually in sequence within each addressed row. Generator 17 is implemented in any appropriate logic form, many of which are known in the art, to produce the plural recurrent clocking and control signals required to synchronize the imager operation as herein described. Each of the various outputs of generator 17 is labeled to suggest the function performed, and which is herein described. In order to avoid undue complication of the drawing, only a few actual connections of those outputs are shown; the other connections are indicated by application of corresponding input signal labels to circuits to which connections would otherwise be shown.

Two VSRs are advantageously employed because array vertical select, or address, lines which they drive, in one implementation of the array integrated circuit device, are relatively high resistance, so-called polysilicon, layer lines. Because of the relatively large length of those lines in the illustrative wide field of view system, the use of an address scanning shift register at each end of the lines assures adequate address signal strength throughout the line length, reduces resistance-capacitance signal propagation time delay along the line, and affords a measure of redundancy in the event of a break in a vertical gate line (to be described).

A fully selected pixel, i.e., a pixel enabled by address signals from both vertical and horizontal shift registers, releases its integrated photonic charge through sensing system circuits (to be described) to any appropriate array output circuit, such as an output amplifier 18. That amplifier applies sensed signal information to a further utilization device (not shown) such as a video display terminal or a frame signal store.

Each pixel 11 comprises a platinum silicide (PtSi), Schottky-barrier photodiode, such as diode 19, having its anode connected to ground. The cathode of diode 19 is connected through the series combination of internal source-drain current paths of two metal oxide silicon (MOS) field effect transistors (FET) 20 and 21 to one of a plurality of horizontal signal lines, such as the horizontal signal line (HSL) 22. Each of the pixel FETs is advantageously an N-channel, enhancement mode transistor.

Each of the FETs 20 of the pixels has its drain terminal connected to the adjacent one of the HSLs 22 and its gate terminal connected to an adjacent one of a plurality of horizontal gate lines, such as the horizontal gate line (HGL) 23. Each HGL 23 extends vertically, as illustrated, and is connected to gate terminals of adjacent FETs, corresponding to the FET 20, in pixels of the column of pixels adjacent to the HGL. All of the 640 HGLs are pulsed in recurring sequence, once during each shift step period of VSRs 13 and 16, by horizontal select (HSEL) outputs of HSR 12 to enable all FETs along each HSL. Thus, all FETs 20 along an HSL 22 are enabled in sequence once during each shift step period of VSRs 13 and 16. Each HSL has a significant inherent, or distributed, capacitance to ground which is schematically represented in FIG. 1 by a capacitor 24 connected between each HSL and ground.

Similarly, all FETs 21 of pixels along a pixel row adjacent to an HSL 22 have a source terminal connected to the cathode of the diode 19 of the pixel and a gate terminal connected to a vertical gate line (VGL), such as VGL 26. The FETs 21 along a VGL 26 are enabled simultaneously for conduction throughout the VSR 16 shift step period that applies a VSEL signal to the VGL. Thus, the FETs 21 of a row of pixels along an HSL 22 are enabled each time a vertical select (VSEL) signal is applied from the VSRs 13 and 16 to a VGL 26 which also is adjacent to the same row of pixels. A pixel is fully selected when its FETs 20 and 21 are both enabled by HSEL and VSEL pulses, respectively, at the same time.

Figure 4:
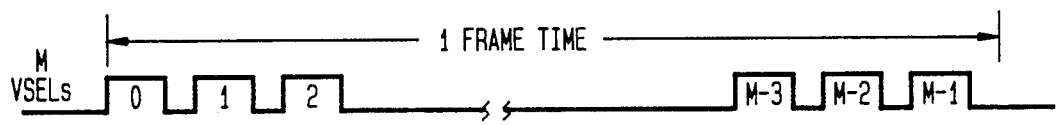
FIG. 4 is a pulse wave diagram illustrating vertical selection pulses of a frame period in operation of the system of FIG. 1.

FIG. 4 illustrates a sequence of VSEL pulses that would be produced by the VSRs 13 and 16 on their sequential stage outputs for an M-row array 10 (although for simplicity of drawing they are shown on a single time line). In the illustrative embodiment M is 480 rows; and the VSEL pulses 0 through 479 indicated represent those appearing during scanning of a single frame, i.e., a time interval in which all pixels of array 10 are successively scanned once. The VSEL pulses are shown as being spaced in time from one another, but the actual retrace time between successive pulses is so small in relation to the VSEL pulse duration as to disappear in the scale of the FIG. 4 were it not shown in expanded scale.

Figure 5:
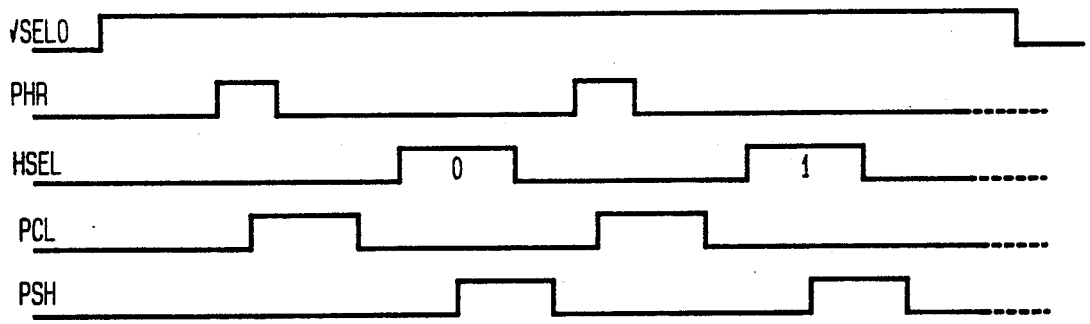
FIG. 5 is a timing diagram illustrating operation of the circuits of FIGS. 2 and 3 in relation to the diagram FIG. 4.

FIG. 5 illustrates a representative portion of other control signals that are produced during a single VSEL pulse period, such as the VSEL0 signal shown at the top of the figure. The representative signals are those related to two HSEL signals, HSEL0 and HSEL1, of the N HSEL signals produced by the HSR 12 on its respective outputs during a single VSEL pulse period. In the illustrative embodiment N is 640.

One end of each HSL 22 in FIG. 1 is connected to a high impedance input connection of an isolating switch, such as the switch 27, which will be described in detail subsequently in connection with FIG. 2. Control of switch conduction is exercised at the input connection, but the high impedance of that connection prevents significant current flow between that input connection and the switch output even when signals are being coupled between them. In the illustrative embodiment, each switch 27 comprises the gate terminal of a source-follower-connected FET. A fully selected pixel releases photonic charge, integrated by its diode 19 between times of full selection, to its adjacent connected HSL 22 to control the conduction level of the switch 27 connected to that line. That same switch will also have been enabled for conduction at that time by the same VSEL signal which cooperated in the full selection of the pixel.

Whenever a pixel is fully selected, there is an equalization of the charge accumulated by its diode 19 and the charge on the inherent capacitance, represented by capacitor 24, of the connected HSL 22. The resulting change in charge on capacitor 24 is proportional to the charge that had theretofore been accumulated by diode 19 since its last prior full selection (one frame period earlier in the basic mode of operation discussed so far), and it is the HSL signal that controls the conduction level of the connected isolating switch 27. The resulting charge level remaining on diode 19 is its base charge level from which it accumulates further photonic charge following the end of the current full selection. "Base charge level" is the level determined by a fixed reset potential on the horizontal signal line as modified slightly by the equalization exchange with capacitor 24.

Each switch 27 output is coupled to output amplifier 18 via a VSL, such as VSL 28. It is illustratively preferred to group HSLs in groups of, e.g., eight lines, and provide a separate VSL to serve each group. Thus, if the HSLs 22 are further designated in a modulo-8 manner, in the sequence of rows from bottom to top (as illustrated) of the array 10, HSL(0), HSL(8), etc. are served by VSL 28; HSL(1), HSL(9), etc. are served by a VSL 29; and so forth; so that the row of no HSL is adjacent in the array to the row of another served by the same VSL.

Figure 2:
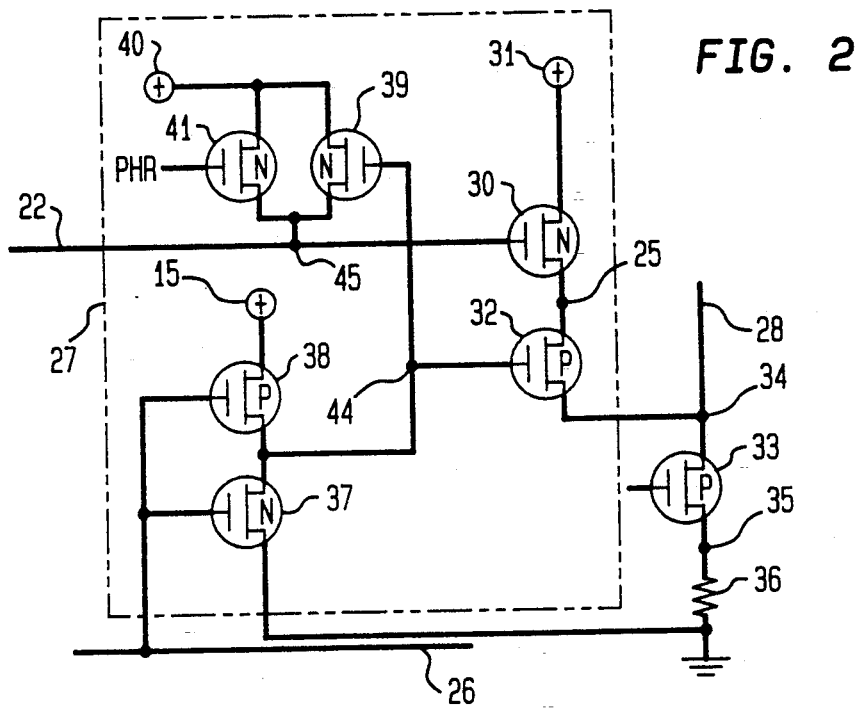
FIG. 2 is a schematic diagram of a source-follower type of isolating switch for use in the system of FIG. 1.

FIG. 2 illustrates schematic detail of one of the isolating switches 27. Like reference characters are used in FIG. 2 for elements shown there which are the same as those in FIG. 1. HSL 22 is connected to the gate terminal of a depletion mode, N-channel FET 30 which, as will subsequently appear, is connected in a source follower circuit. The drain terminal of FET 30 is connected to a positive supply 31 indicated by a circled plus sign to represent schematically a positive source which has another terminal of opposite polarity connected to ground. Similar schematic representation is employed for other supplies to be noted herein. The source terminal of FET 30 is connected through the drain-source internal path of a P-channel FET switch 32, the VSL 28, a multiplexing switch, P-channel FET 33 (to be described), and a common (for all isolating switches 27 and their VSLs) load such as a load resistor (member) 36. Other types of common load may be employed such as, e.g., a field effect transistor current source. The short diagonal line shown connected to the upper end of resistor 36 schematically represents connection to all other VSLs of the imager, as shown more fully in FIG. 1. A source follower type connection for FET 30 is preferred, e.g., as compared to an inverting amplifier type of connection, because the gain sensitivity of a source follower to transconductance variations can be shown to be about an order of magnitude less than for an inverting amplifier configuration.

As a pulse is clocked through each stage of VSRs 13 and 16 in FIG. 1, that stage produces an output pulse VSEL that is applied to the corresponding vertical address, or gating, line (VGL) 26 of the array 10. Such a VSEL pulse for the bottom VGL in FIG. 1, i.e. VSEL(0), can be seen in the timing diagram of FIG. 5. Before a VSEL pulse appears on VGL 26 in FIG. 2, that line is at a low voltage, such as ground, provided at the VSR stage output. An inverter, including two FETs 37 and 38 of opposite conductivity types, produces a high output that is applied to gate terminals of the P-channel switch FET 32 and an N-channel FET 39. FET 32 is thereby biased nonconducting, i.e., OFF, so that VSL 28 can not be affected by signal variations on HSL 22. FET 39 is biased conducting, i.e., ON, to clamp HSL 22 to the positive voltage of a supply 40 in the absence of a VSEL pulse on line 26. That clamp limits the extent of possible charge accumulation in inherent capacitance, i.e. capacitor 24 in FIG. 1, of HSL 22.

When a VSEL pulse, e.g., pulse VSEL(0) in FIG. 5, appears on VGL 26 in FIG. 2, it enables the FET 21 (FIG. 1) of all pixels along the line as previously noted; and it is inverted by action of FETs 37 and 38 (FIG. 2) to provide a low voltage to turn switch FET 32 ON, and turn clamping FET 39 OFF, for the duration of the VSEL pulse. Thereafter during that pulse, a horizontal reset pulse PHR is applied to the gate terminal of an N-channel FET 41 in all isolating switches 27 of array 10 at the same time, from timing signal generator 17 (in FIG. 1), just prior to each HSEL signal. FIG. 5 shows two such PHR pulses, and the associated pulses HSEL(0) and HSEL(1) [both shown, for drawing convenience, on the same line in FIG. 5 even though they appear on different HGLs 23 in FIG. 1]. Each PHR pulse biases FET 41 ON to clamp HSL 22 briefly to the voltage of supply 40 as part of a correlated double sampling operation, performed cooperatively with the output amplifier 18 as will be subsequently described, to reset inherent capacitance along the HSL to a known base level of charge and to reduce the reset operation noise sensed by the output of amplifier 18.

It can now be seen, e.g., in FIG. 5, that during each successive HSEL pulse, the pixels along the HSL 22 are successively fully selected and couple the integrated charge voltages of their photodiodes 19 to HSL 22, as previously described. That voltage biases the source follower FET 30 (FIG. 2) ON for conduction at a level corresponding to the magnitude of the charge voltage. Switch FET 32 is also ON at that time; and, since multiplexing switch FET 33 is also ON at that time, the resulting current in load resistor 36 develops a corresponding output signal.

Returning to consideration of the imager in FIG. 1, each of the VSLs has its lower end coupled through a multiplexing switch FET, such as the FET 33, to the above-ground end of load resistor 36. A multiplexing shift register, i.e., multiplexer 42, is driven at the vertical selection rate (VSRCLK) by a pulse train MUXCLK from timing generator 17, to supply sequential low pulses to the mentioned multiplexing switch FETs for connecting the VSLs to load resistor 36 in recurring sequence.

In some applications, amplifier 18 can have its input coupled to the upper terminal of load resistor 36. However, in the illustrative imaging system, the VSL, whether one VSL or plural VSLs are used, is formed in a so-called metal-1 layer of the integrated circuit device. Although the VSL in the metal-1 layer has relatively low resistivity, it is a relatively long line and therefore has a significant resistance. In that case, during readout of pixel signals from an HSL, a significant voltage drop is developed in the part of the VSL which actually carries the HSL-controlled source-follower current. That drop represents a signal loss as well as representing a nonuniformity in coupling characteristic through the VSL for HSLs at different row positions in the array 10. This problem is substantially reduced by coupling the amplifier 18 input to the upper end of the VSL, which carries no significant signal current and, therefore, faithfully couples the HSL signal which appears at the output of an isolating switch 27. In the illustrative embodiment of FIG. 1, a second set of multiplexing switch FETs, such as the P-channel FET 43, is provided for coupling the upper (as illustrated) ends of the VSLs, respectively, to the input of amplifier 18. Source terminals of FETs 43 are connected together and, by a lead 47, to the input of amplifier 18. A second multiplexing shift register, i.e., multiplexer 46, is driven in step with the multiplexer 42 to control gate terminals of the FETs 43.

All shift registers in the imaging system 9 are reset at the ends of their respective shifting cycles to assure clearing of any spurious ONEs that may have appeared due to noise, Reset pulses are supplied by generator 17. Thus, VSRs 13 and 16 are reset by a pulse VR after every 480 shifts, HSR 12 is reset by a a pulse HR after every 640 shifts, and multiplexers 42 and 43 are reset by a pulse MR after every 8 shifts. Each reset pulse is also followed by a pulse of appropriate polarity to the register data input to prepare the register to continue regular shifting without interruption.

Figure 3:
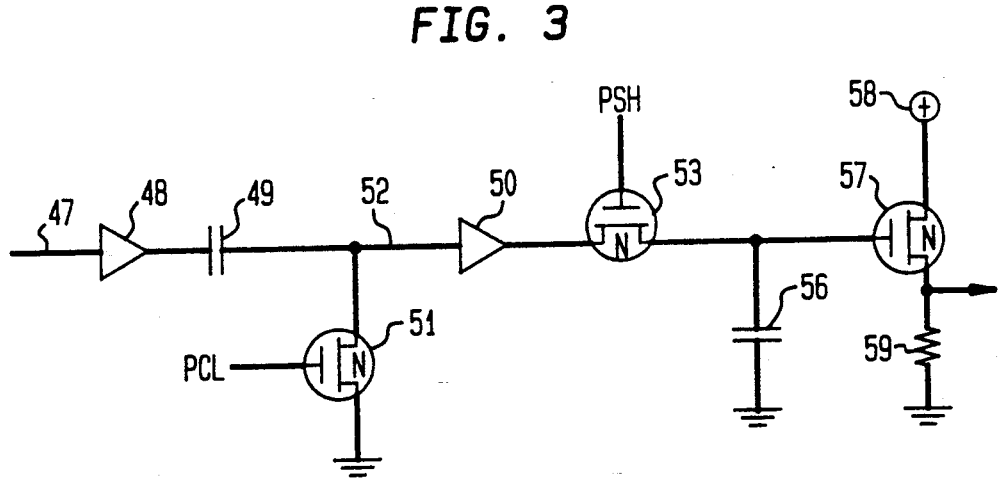
FIG. 3 is a simplified circuit diagram of an output amplifier for use in the system of FIG. 1.

In FIG. 3 there is shown a simplified circuit diagram of the output amplifier 18. This circuit is arranged for correlated double sampling (CDS), in cooperation with the isolating switches 27, to reduce the impact of noise of the HSL reset operation on the array readout signal coupled through amplifier 18. To that end, a preamplifier 48 receives at its input the signal on lead 47 and couples that signal through a capacitor 49 to an input of an amplifier 50. An N-channel FET 51 has its drain terminal connected to a lead 52, between capacitor 49 and amplifier 50, and its source terminal connected to ground. FET 51 periodically clamps lead 52 to ground in response to PCL pulses applied to its gate terminal from generator 17 (FIG. 1).

It can be seen in FIG. 5 that the beginning portion of each PCL pulse occurs during the trailing portion of one of the resetting PHR pulses and persists until shortly before the next HSEL pulse. Thus, noise due to the recurrent reset operation on an HSL 22, and which is coupled through preamplifier 48, produces a corresponding charge on capacitor 49. During the next following HSEL pulse, the pixel readout signal provided from the fully selected pixel is applied by preamplifier 48 in series opposition to the reset noise charge in capacitor 49 for thereby largely offsetting the effects in the readout of similar noise associated with the full selection of the pixel.

Output of amplifier 50 is sampled, by application of a PSH pulse, from generator 17, at the gate terminal of an N-channel FET 53, into a holding capacitor 56 connected between ground and the drain of that FET. PSH occurs during the trailing part of each HSEL pulse as can be seen in FIG. 5. Charge voltage held in capacitor 56 controls the conduction level of an output N-channel FET 57 which is source-follower connected between a positive voltage supply 58 and a grounded load resistor 59.

Figure 6:
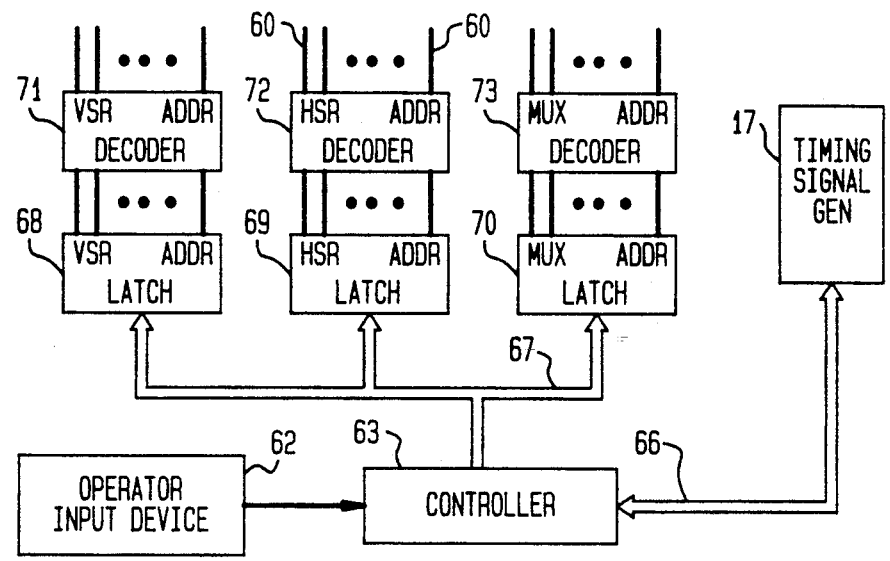
FIG. 6 is a block and line diagram of circuits for controlling the timing and the shift register data patterns in the system of FIG. 1.

The various shift registers hereinbefore mentioned operate at different clock rates and, as just described, can be conveniently initiated, and maintained in synchronism, by providing from timing generator 17 appropriate periodic serial data input pulses to be clocked along the respective registers and providing corresponding periodic reset pulses. It has been found, however, that operational capabilities of the illustrative imaging system are enhanced by employing serial data pulse sequences of selectable coordinated patterns and initially presetting a set of those patterns for a predetermined mode of operation into their respective shift registers. Then clocking of all registers at their respective rates is started simultaneously. The preset pattern for each shift register is reinserted periodically as the length of the register requires for continued operation. To facilitate that type of operation, the shift registers of FIG. 1 are provided with bit-parallel presetting input connections, such as those indicated by the pair of short perpendicular lines 60 along one side of the HSR 12. Similarly a control input connection 61 is indicated on the side of timing signal generator 17. A block and line diagram for one form of logic circuitry to implement this presetting technique is illustrated in FIG. 6. One improved operating feature is variable integration, i.e., an electronic iris function; and the FIG. 6 circuitry will be described in connection with that feature. This variable integration function is described and claimed in the copending U.S. Patent Application denoted in the Related Applications For Patent section hereinabove.

In FIG. 6 is shown one form of logic circuits for controlled presetting of data patterns into the various shift registers of the system of FIG. 1 to enable selectable different modes of array scanning operation of the system. One such mode is a variable integration mode, sometimes called an "electronic iris." By using that mode, an operator can adapt system operation to different illumination levels of a scene that is to be detected by array 10. The adaptation is accomplished by providing a dual-pulse data pattern for shifting through the VSRs 13 and 16, and allowing the multiplexers 42 and 46 to connect the VSL of a selected HSL of the array to the output amplifier 18 during only the second one of the two resulting VSEL pulses. The time spacing between the dual pulses of the VSR shifting data pattern, and hence the time between the resulting two successive VSEL pulses applied to each array row during a frame, is selected to allow pixels of that row sufficient additional integration time to accumulate charge to represent the corresponding part of the scene being detected. Thus, if a scene to be imaged exhibits low illumination, the spacing between the dual pulses in the VSRs can be increased to allow more integration time. Or if illumination is too high, the spacing can be decreased. This mode of operation will be further described subsequently in greater detail in connection with FIGS. 7 and 8.

In FIG. 6, an operator input device 62, e.g., a keyboard, is used to input to a controller 63 information specifying a mode of operation and user data necessary for that operation. For example, an operator may specify by appropriate commands the basic mode of operation previously described in connection with FIG. 1, or the variable integration mode with the required time delay between the dual pulses of the VSR data pattern, or some other mode. Controller 63 can be any suitable such device including a microprocessor and associated command interpreter and memory for program and data. A bidirectional bus 66 couples controller 63 to timing signal generator 17 to receive synchronized clocking for the controller circuits and to communicate reconfiguration commands to generator 17 for adapting it to the different needs (if any) of different modes of operation. A data and address bus 67 couples controller bit-parallel output selectably to VSR address latch 68, HSR address latch 69, and multiplexer address latch 70. Latches 68–70 receive stage number addresses and hold them while providing corresponding outputs to respective VSR address decoder 71, HSR address decoder 72, and multiplexer address decoder 73. The decoders convert the addresses to high voltage levels, i.e., binary ONEs, on decoder output connections to appropriate presetting inputs to a stage or stages of the VSR and HSR shift registers. Decoder 71 supplies presetting signals to both of the VSRs 13 and 16, and decoder 73 supplies presetting signals to both of the multiplexers 42 and 43. The inverting outputs (not specifically shown) of the multiplexers 42 and 43 are used to convert the binary ONE to a low logic level for actuating multiplexing P-channel FETs 33 and 43.

Given the concept of presetting various pulse patterns into imaging system shift registers to cause them to give the system nonstandard capabilities, various digital circuit techniques can be used by those skilled in the art to accomplish the presetting. FIG. 6 offers in simplified form but one approach to that task. Controller 63 memory has stored therein routines for the respective modes of operation to control the initial and recurrent presetting of the various shift registers of the imaging system. Those routines all follow a basic algorithm including the steps of:

1. Configure timing generator 17 to provide required periodic control signals, such as those indicated in FIG. 1.
2. Load shift register stage-addresses, for locations of pulses, e.g. binary ONEs, into the respective shift register address latches for decoding to appropriate shift register stage input leads by associated shift register address decoders.
3. Preset, sometimes called "jam" set, the address decoder outputs into the respective shift registers.
4. Repeat steps #2 and #3 an appropriate number of times for any shift register requiring more than one pulse in its pattern for the operating mode commanded.
5. Apply clocking signals to all shift register In the simplest mode of operation, that described in connection with FIG. 1, the logic of FIG. 6 initially causes a pattern including only a single-binary-ONE, first-stage pattern to be loaded into each shift register; and then clocking from generator 17 is started. In each shift register, when its ONE reaches the last stage of the register and has been held there for the appropriate length of time, a reset pulse (VR, HR, or MR) is applied to the register to clear it of any spurious ONEs that may have appeared due to noise; and then the register is preset again as described above. Alternatively, the reset pulses can be omitted if the presetting from decoders is arranged to force every stage to its appropriate binary ONE or ZERO state.

For the variable integration mode of operation, the process is similar, the principal differences being that a two-pulse pattern is employed in the VSRs 13 and 16; and a delayed-single-pulse pattern is employed in the multiplexing registers 42 and 43. In the illustrative example described below in connection with FIGS. 7 and 8, the two VSR pulses are space by two pulse periods, i.e., in each frame each stage of a VSR produces a first output VSEL pulse and then in the third pulse period thereafter it produces a second output VSEL pulse. It is apparent that once the initial pulse has propagated a sufficient number of stages into the register, there will be two stages producing VSEL pulses at the same time. The two pulses of the pattern can be separated by any of the numbers of pulse periods that are possible in the stages of the VSR used for the system except that no spacing can be used that would cause two array rows served by the same VSL to be selected at the same time since the output of each would be merged with that of the other. Since it was previously specified that adjacent HSLs are coupled to different VSLs, in a modulo-8 sequence, and as long as the dual VSR pulses are not spaced at exactly the number of plural VSLs, the two simultaneous VSEL pulses necessarily select array rows coupled to different VSLs. Only one of those simultaneously selected rows can be connected to the output at any given time by the multiplexers.

Figure 7:
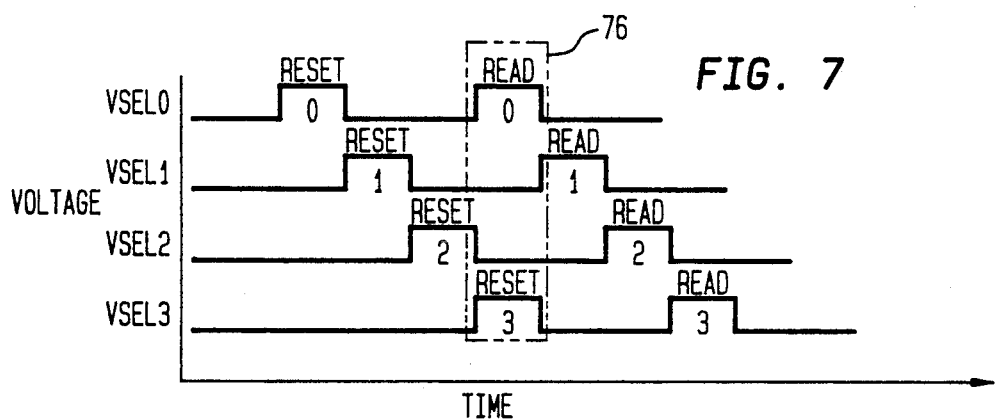
FIGS. 7 and 8 are timing diagrams illustrating a variable integration mode of operation of the system of FIG. 1 which is in accordance with an invention which is described and claimed in the copending U.S. Patent Application denoted in the Related Applications For Patent section hereinabove.
Figure 8:
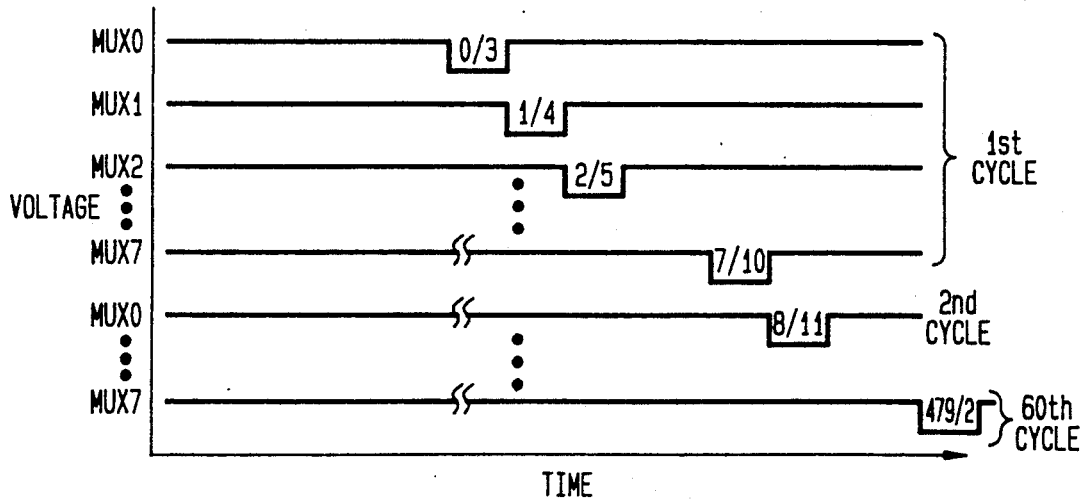

Referring to FIGS. 7 and 8, FIG. 7 shows the time relationship of output VSEL pulse pairs from each of the first four stages of one of the VSRs, e.g. 16. The first-stage pair is designated VSEL0, the second VSEL1, etc. In actual practice, successive appearances of output pulses at two adjacent stages are slightly spaced, accounting for the horizontal scan blanking-for-reset interval; but that slight spacing is proportionately so small that it is lost in the scale of the FIG. 7. Also, as shown in FIG. 8, the multiplexer register, negative-going, single-pulse pattern, which is produced by both multiplexers, is shifted in time so that the first stage outputs of the multiplexers 42 and 43 do not occur until the occurrence of the second one of the two VSR pattern pulses.

In FIG. 7, a numeral in each pulse time indicates the VSR stage in which the pulse is produced, an alphabetic label over each pulse indicates whether it is a RESET or a READ pulse, and a broken-line box 76 encloses one example of simultaneously occurring VSEL pulses from the stages producing VSEL output pulses numbered 0 and 3. Similarly in FIG. 8, multiplexing register, negative-going, output pulses from representative ones of the stages of registers 42 and 43 are indicated. In the illustrative system having 480 rows and eight VSLs, the multiplexers cycle 60 times in each frame period; and portions of the 1st, 2nd, and 60th cycles are shown. Numerals within each pulse time indicate the number of the VSR stage producing a reading VSEL pulse and (separated by a slash) the number of the VSR stage producing a resetting VSEL pulse at the same time. Thus, "2/5" in the multiplexer stage 2 output indicates that, in the first multiplexer cycle, VSR stage 2 output is the reading VSEL pulse and VSR stage 5 output is the resetting VSEL pulse. Similarly, in the second cycle, "8/11" indicates that the VSR stage 8 is producing the reading pulse; and VSR stage 11 output is producing the resetting pulse. Likewise, in the 60th cycle, "479/2" indicates that VSR stage 479 output is the reading pulse and VSR stage 2 output is the resetting pulse. Accordingly, only the VSL coupled to a row that is selected for reading is actually connected by the multiplexers to output amplifier 18.

During the first, or resetting one, of the two VSR data pattern pulses, i.e. VSEL0, the HSL 22 of the selected row in the array is reset recurrently by PHR pulses, as previously described in connection with FIG. 2. During each HSEL pulse of that selection period there is no output from that row because its isolating switch 27 and VSL are not connected by the multiplexers 42 and 43 to either the load resistor 36 or the output amplifier 18. The charge on each pixel diode is equalized with capacitor 24 to its new base charge level as previously discussed. In the interval between VSEL pulses of the pair selecting that same row, the pixel photodiodes along the row continue to charge. During the second, or reading one, of the two VSEL pulses applied to that same row, its isolating switch and VSL are connected by the multiplexers to load resistor 36 and amplifier 18 to read out successive output signals indicative of the new charge levels on the respective diodes 19 of the pixels successively fully selected by HSEL pulses during the read VSEL pulse period. It is noted that during any charging interval of photodiode 19, its charge may increase or decrease depending upon changes in scene illumination level in that same interval.

It should be observed that the resetting of an HSL is a resetting of the charge on inherent capacitance along the line to a known voltage level and not a resetting of the charge on any pixel photodiode. Thus, PHR pulses occurring during either a resetting or a reading VSEL pulse at a given row do not reduce the pixel photodiode charge to the reset level because PHR occurs between HSEL pulses; so there is no fully selected pixel at that time and no closed current path into which the diode could discharge. However, during each full selection that follows a PHR pulse, the pixel diode charge is equalized to its new base charge level.

As hereinbefore indicated, various combinations of shift register control parameters, such as data pulse patterns, clocking rates, and reset times, can be utilized in the array 10 to produce different imaging system capabilities.

Viewed from another aspect, the present invention is directed to an imaging system for recording the illumination level of a scene comprising a plurality of pixels, a plurality of sensing circuits, means for addressing the pixels in recurring sequence within a row at a time, and row by row, a plurality of isolating switches, means, responsive to the addressing means, for closing said isolating switches (i.e., to a conducting condition) at the same time that plural pixels are coupling their charge voltages to the horizontal signal line that controls the conduction level of such switch, output circuit means, at least one vertical signal line, connected to the isolating switches, and first means for connecting said at least one vertical signal line to said output circuit means. The plurality of conductive picture elements serve to store a charge voltage corresponding to the level of illumination of a respective part of a scene, said pixels being arrayed in rows and columns of pixels. The sensing circuits are each connected to pixels of one of said rows of pixels. The means for addressing said pixels in recurring sequence within a row at a time, and row by row, for fully selecting at least one pixel at a time to couple their charge voltages to one of said horizontal signal lines. Each of the isolating switches having an input connection to a respective one of said horizontal signal lines for receiving input signals to control electric current conduction level in such switch. The input connection having a substantially current blocking high impedance whether the switch is open, nonconducting, or closed conducting.

Viewed from another aspect, the invention is an imaging system comprising: a plurality of pixels for storing an electric charge voltage corresponding to the level of illumination from a respective part of a scene, said pixels being arrayed in rows and columns of pixels; a plurality of horizontal signal lines, each connected to pixels of one of said rows of pixels; means for addressing said pixels to cause them to be connected, in recurring sequence within a row at a time and row by row, to one of said horizontal signal lines; output circuit means for producing electric signals; a plurality of vertical signal lines; said horizontal signal lines being assigned to different ones of a plurality of groups equal in number to said plurality of vertical signal lines; a plurality of switches each connected between an end of a respective one of said horizontal signal lines and one of said vertical signal lines; means for connecting outputs of all of said switches of horizontal signal lines of each group to one of said vertical signal lines which is not so connected to another group of said horizontal signal lines; means, responsive to said addressing means, for closing one of said switches (i.e., to a conducting condition) during the same time interval in which plural pixels within the row are being connected to the horizontal signal line which is connected to such one switch; and said output circuit means comprising means for multiplexing signals from said vertical signal lines in synchronism with said addressing means to produce said electric signals in said recurring sequence.

Viewed from still another aspect, the invention is a switch in an imaging system for recording illumination levels of a scene including rows and columns of addressable pixels, plural horizontal signal circuits for collecting stored charges of fully selected pixels in respective rows, and at least one vertical signal circuit for collecting the stored signals from said horizontal signal circuits, the switch for coupling signals between one of said horizontal signal circuits and said at least one vertical signal circuit but substantially blocking current flow between the one horizontal signal circuit and the at least one vertical signal circuit at all times whether said switch is open or closed. The switch comprises a first field effect transistor having a gate terminal connected to said one horizontal signal circuit and having a source terminal connected to said at least one vertical signal circuit; a second field effect transistor connected in series with said first transistor with source terminals of said first and second transistors connected together; means for selectably clamping said one horizontal signal circuit to a predetermined voltage; means for receiving and inverting pixel addressing signals which also enable pixels along said one horizontal signal circuit for full selection; means, responsive to said receiving and inverting means, for either (a) simultaneously enabling conduction in said second transistor and disabling said clamping means when pixels may be fully selected along said one horizontal signal circuit or (b) simultaneously disabling conduction in said second transistor and actuating said clamping means when pixels may not be fully selected along said one horizontal signal circuit; and additional means for clamping said one horizontal signal circuit to said predetermined voltage for an interval of predetermined duration prior to each pixel full selection time.

Although the invention has been described in connection with particular embodiments, additional embodiments, modifications, and applications which will be obvious to one skilled in the art are included within the spirit and scope of the invention.

What is claimed is:

1. In an imaging system for recording illumination levels of a scene, the system including rows and columns of addressable picture elements, herein pixels, plural horizontal signal circuits for collecting stored charges of fully selected pixels in respective rows, and at least one vertical signal circuit for collecting said stored signals from said horizontal signal circuits, and means for coupling each pixel to the its respective horizontal signal circuit the improvement comprising:

a plurality of isolating switches each having an input connection to a respective one of said horizontal signal circuits for receiving input signals to control electric current conduction level in said switches said input connection having a substantially current blocking, high impedance whether the switch is open, nonconducting, closed, or conducting;

means for coupling an output of each of said isolating switches to said at least one vertical signal circuit; and means for closing each of said isolating switches at the same time when the stored charges of fully selected pixels are being collected by the horizontal signal circuit that controls the conduction level of each isolating switch.

2. An imaging system for recording illumination level of a scene and comprising:

a plurality of electrically conductive picture elements, hereinafter called pixels, for storing a charge voltage corresponding to the level of illumination of a respective part of a scene, said pixels being arrayed in rows and columns of pixels;

a plurality of sensing circuits, herein called horizontal signal lines, each connected to pixels of one of said rows of pixels;

means for addressing said pixels in recurring sequence within a row at a time, and row by row, for fully selecting at least one pixel at a time to couple their charge voltages to one of said horizontal signal lines;

a plurality of isolating switches each having an input connection to a respective one of said horizontal signal lines for receiving input signals which control electric current conduction level in each switch, said input connection having a substantially current blocking, high impedance whether the switch is open, nonconducting, closed, or conducting;

means, responsive to said addressing means, for closing said isolating switches (i.e., to a conducting condition) at the same time the plural pixels are coupling their charge voltages to the horizontal signal line that controls conduction level of each switch;

output circuit means;

at least one further sensing circuit, herein called a vertical signal line, connected to said isolating switches; and first means for connecting said at least one vertical signal line to said output circuit means.

3. The imaging system of claim 2 in which said addressing means comprises:

at least two shift registers for addressing rows of said pixels of said array, each of said shift registers having plural stages through corresponding pairs of which data are synchronously shifted in a predetermined sequence;

a plurality of row address circuits, each extending along a different row of said array and connected to each pixel of that row; and means for coupling outputs of each of said corresponding pairs of stages of said shift registers to opposite ends, respectively, of a different one of said address circuits.

4. The imaging system of claim 2 in which:

said each isolating switch comprises a field effect transistor having its gate terminal connected to said one horizontal signal line and having its source terminal connected to said at least one vertical signal line;

said output circuit means includes a load means;

said first connecting means includes means for connecting said load means to said at least one vertical signal line to form with any conducting one of said transistors a source follower circuit.

5. The imaging system of claim 4 in which each of said isolating switches comprises:

means for selectably clamping said one horizontal signal line to a predetermined voltage; and means, responsive to said closing means, for operating said isolating switches by either (a) simultaneously enabling conduction in said field effect transistor and disabling said clamping means or (b) simultaneously disabling conduction in said field effect transistor and actuating said clamping means.

6. The imaging system of claim 5 in which said operating means further comprises additional means for clamping said one horizontal signal line to said predetermined voltage for an interval, of predetermined duration, prior to each pixel full selection time.

7. The imaging system of claim 2 in which:

a plurality of said vertical signal lines are provided;

each of said horizontal signal lines is assigned to one of a plurality of groups, said plurality of groups equal in number to said plurality of vertical signal lines;

second means are provided for connecting outputs of all of said isolating switches of said horizontal signal lines of a group to one of said vertical signal lines which vertical signal line is not connected to another group of said horizontal signal lines; and said first connecting means comprises means for multiplexing signals from said vertical signal lines to said output circuit means.

8. The imaging system of claim 7 in which said output circuit means comprises:

a load member connected between said multiplexing means and ground to develop output potential differences corresponding to signals on said horizontal signal lines.

9. The imaging system of claim 8 in which said output circuit means further comprises:

an output amplifier having an input connected across said load member to be responsive to said signals from said vertical signal lines.

10. The imaging system of claim 8 in which said output circuit means further comprises:

an output amplifier; and further multiplexing means for connecting an input of said output amplifier across a series combination of said load member and said at least one vertical signal line.

11. The imaging system of claim 10 in which:

said pixels are in a planar array having said isolating switches located in a column parallel to said columns of pixels;

said vertical signal lines each has a significant resistance compared to the resistance of said load member and said vertical signal lines are parallel to one another and to said column of said isolating switches;

each of said isolating switches has its output connected to a point on its one of said vertical signal lines which is intermediate the ends of such line at a point closest to the position of such switch and its horizontal signal line in said array, whereby said output amplifier input is at substantially the same potential with respect to ground as the output of a closed one of said switches connected to the same at least one vertical signal line.

12. The imaging system of claim 7 in which:
said addressing means comprises at least one shift register having a predetermined number of stages for recurrently addressing rows of said array, and means for presetting said shift register to a predetermined pattern of a pair of sequential pulses spaced along said shift register any a number of stages except a number equal to the number of said plural vertical signal lines; and
said multiplexing means includes means for connecting to said output circuit means at any time only the one of said vertical signal lines which is connected to one of said switches which is then enabled by the second occurring one of said pulses of said pair.

13. An imaging system comprising:
a plurality of electrically conductive picture elements, hereinafter called pixels, for storing an electric charge voltage corresponding to the level of illumination from a respective part of a scene, said pixels being arrayed in rows and columns of pixels;
a plurality of sensing circuits, herein called horizontal signal lines, each connected to pixels of one of said rows of pixels;
means for addressing said pixels to cause them to be connected, in recurring sequence within a row at a time and row by row, to one of said horizontal signal lines;
output circuit means for producing electric signals;
a plurality of further sensing circuits, herein called vertical signal lines;
said horizontal signal lines being assigned to different ones of a plurality of groups equal in number to said plurality of vertical signal lines;
a plurality of isolating switches each connected between an end of a respective one of said horizontal signal lines and one of said vertical signal lines and each having an input connection to a respective one of said horizontal signal circuits for receiving input signals to control electric current conduction level in said switches said input connection having a substantially current blocking, high impedance whether the switch is open, nonconducting, closed, or conducting;
means for connecting outputs of all of said switches of horizontal signal lines of each group to one of said vertical signal lines which vertical signal line is not connected to another group of said horizontal signal lines;
means, responsive to said addressing means, for closing one of said switches (i.e., to a conducting condition) during the same time interval in which plural pixels within the row are being connected to the horizontal signal line which is connected to such one switch; and
said output circuit means comprises means for multiplexing signals from said vertical signal lines in synchronism with said addressing means to produce said electric signals in said recurring sequence.

14. The imaging system of claim 13 in which said output circuit means comprises:
a load means connected between an output of said multiplexing means and ground to develop output potential differences corresponding to signals on said horizontal signal lines.

15. The imaging system of claim 14 in which said output circuit means further comprises:
an output amplifier having an input connected across said load means to be responsive to said electric signals.

16. The imaging system of claim 14 in which said output circuit means further comprises:
an output amplifier; and
further multiplexing means for connecting an input of said output amplifier across a series combination of said load member and said at least one vertical signal line.

17. The imaging system of claim 16 in which:
said pixels are in a planar array having said isolating switches located in a column parallel to said columns of pixels;
said vertical signal lines each has a significant resistance compared to the resistance of said load member and said vertical signal lines are parallel to one another and to said column of said isolating switches; and
each of said isolating switches has its output connected to a point on its one of said vertical signal lines which is intermediate the ends of such line at a point closest to the position of such switch and its horizontal signal line in said array, whereby said output amplifier input is at substantially the same potential with respect to ground as the output of a closed one of said switches connected to the same at least one vertical signal line.

18. The imaging system of claim 2 in which said each isolating switch comprises:
a first field effect transistor having a gate terminal connected to said one horizontal signal circuit and having a source terminal connected to said at least one vertical signal circuit;
a second field effect transistor connected in series with said first transistor with the source terminals of said first and second transistors connected together;
means for selectably clamping said one horizontal signal circuit to a predetermined voltage;
means, responsive to said closing means, for operating said isolating switches by either (a) simultaneously enabling conduction in said second transistor and disabling said clamping means when pixels may be fully selected along said one horizontal signal circuit or (b) simultaneously disabling conduction in said second transistor and actuating said clamping means when pixels may not be fully selected along said one horizontal signal circuit; and
additional means for clamping said one horizontal signal circuit to said predetermined voltage for an interval of predetermined duration prior to each pixel full selection time.

19. The imaging system of claim 18 in which:
said first field effect transistor is an n-channel depletion mode transistor; and
said second field effect transistor is a p-channel transistor.

20. The imaging system of claim 18 in which said operating means comprises a CMOS signal inverter connected for coupling said addressing means to said selectably clamping means and to a gate terminal of said second transistor for enabling said second transistor for conduction when all pixels along said one horizontal signal circuit are enabled for full selection.

21. In an imaging system for recording illumination levels of a scene, the system including rows and columns of addressable picture elements (herein "pixel"), plural horizontal signal circuits for collecting stored charges of fully selected pixels in respective rows, and at least one vertical signal circuit for collecting said stored signals from said horizontal signal circuits, a switch for coupling signals between one of said horizontal signal circuits and said at least one vertical signal circuit and substantially blocking current flow between said one horizontal signal circuit and said at least one vertical signal circuit at all times whether said switch is open or closed, said switch comprising:

a first field effect transistor having a gate terminal connected to said one horizontal signal circuit and having a source terminal connected to said at least one vertical signal circuit;

a second field effect transistor connected in series with said first transistor with source terminals of said first and second transistors connected together;

means for selectably clamping said one horizontal signal circuit to a predetermined voltage;

means for receiving and inverting pixel addressing signals which also enable pixels along said one horizontal signal circuit for full selection;

means, responsive to said receiving and inverting means, for either (a) simultaneously enabling conduction in said second transistor and disabling said clamping means when pixels may be fully selected along said one horizontal signal circuit or (b) simultaneously disabling conduction in said second transistor and actuating said clamping means when pixels may not be fully selected along said one horizontal signal circuit; and additional means for clamping said one horizontal signal circuit to said predetermined voltage for an interval of predetermined duration prior to each pixel full selection time.

22. The imaging system of claim 21 in which:

said first transistor is an n-channel depletion mode transistor; and said second transistor is a p-channel transistor.

* * * * *